United States Patent
Wang et al.

(10) Patent No.: US 9,438,976 B2
(45) Date of Patent: Sep. 6, 2016

(54) MULTIFUNCTIONAL WIRELESS LED DEVICE AND A MULTIFUNCTIONAL WIRELESS SPEAKER SYSTEM

(71) Applicant: ZHEJIANG SHENGHUI LIGHTING CO., LTD, Jiaxing (CN)

(72) Inventors: Xia Wang, Jiaxing (CN); Chaoqun Sun, Jiaxing (CN); Jinxiang Shen, Jiaxing (CN)

(73) Assignee: ZHEJIANG SHENGHUI LIGHTING CO., LTD, Jiaxing (CN)

( * ) Notice: Subject to any disclaimer, the term of this patent is extended or adjusted under 35 U.S.C. 154(b) by 174 days.

(21) Appl. No.: 14/291,180

(22) Filed: May 30, 2014

(65) Prior Publication Data

US 2014/0270237 A1  Sep. 18, 2014

Related U.S. Application Data

(63) Continuation-in-part of application No. PCT/CN2013/072802, filed on Mar. 18, 2013.

(30) Foreign Application Priority Data

Jan. 14, 2013  (CN) .......................... 2013 1 0013677

(51) Int. Cl.
| | | |
|---|---|---|
| H04R 27/00 | (2006.01) | |
| H04R 1/02 | (2006.01) | |
| H04R 3/00 | (2006.01) | |
| G08C 17/02 | (2006.01) | |
| H05B 37/02 | (2006.01) | |
| H04R 5/04 | (2006.01) | |
| H04S 7/00 | (2006.01) | |

(52) U.S. Cl.
CPC ............... *H04R 1/028* (2013.01); *G08C 17/02* (2013.01); *H04R 3/00* (2013.01); *H05B 37/0272* (2013.01); *H04R 5/04* (2013.01); *H04R 2420/07* (2013.01); *H04S 7/303* (2013.01); *Y02B 20/48* (2013.01)

(58) Field of Classification Search
None
See application file for complete search history.

(56) References Cited

U.S. PATENT DOCUMENTS

2007/0086724 A1* 4/2007 Grady et al. .................... 386/46

* cited by examiner

*Primary Examiner* — Muhammad N Edun
(74) *Attorney, Agent, or Firm* — Anova Law Group, PLLC

(57) ABSTRACT

A multifunctional LED device and multifunctional speaker system are disclosed. A multifunctional LED device consistent with the present disclosure includes a power supply unit configured to supply power; a control unit configured to process audio signals and control commands; an audio power amplifier configured to drive a speaker, a speaker configured to play audio signals, a first wireless transceiver configured to communicate with a smart terminal, a second wireless transceiver configured to communicate with other LED devices, and an LED light source. The multifunctional speaker system includes several multifunctional wireless LED devices configured to works as wireless speakers, and a smart terminal to control the system remotely. The smart terminal may communicate with and control all the multifunctional LED devices. The multifunctional LED devices may communicate with each other as well. Two of the multifunctional LED devices may be configured as a 2.0-channel speaker system. Other speaker systems, such as 2.1-channel, 5.1-channel speaker systems etc., may also be realized by using more multifunctional wireless LED devices. Embodiments consistent with the present disclosure are easy to install, require little wiring, and do not require adding a separate wireless transceiver, a separate remote control unit or a light switch. Embodiments consistent with the present disclosure support wireless lighting controls and provide efficient indoor lighting.

17 Claims, 4 Drawing Sheets

MULTIFUNCTIONAL WIRELESS LED DEVICE AND A MULTIFUNCTIONAL WIRELESS SPEAKER SYSTEM

CROSS-REFERENCES TO RELATED APPLICATIONS

This application is a continuation in part and claims the priority of Chinese Patent Application No. 201310013677.4 (PCT/CN2013/072802 A) filed on Jan. 14, 2013, the entire content of which is incorporated herein by reference.

FIELD OF THE DISCLOSURE

The present disclosure relates to the field of light emitting diode (LED) technologies and, more particularly, relates to a multifunctional LED device and a multifunctional speaker system.

BACKGROUND

Wireless technologies enable users to reduce the amount of wirings needed to set up equipment. Wireless technologies are widely used in modern electronics. LEDs provide controllable lighting and solid-state lighting. They consume less power than traditional lighting devices and are environmentally friendly. Overtime, LEDs have been widely used in various lighting applications such as public place lightings, office and indoor lightings, etc. Wireless control of LED lighting devices provides functions such as remotely switching devices on/off, adjusting lighting, dimming devices, etc. Wireless control of LEDs is well received by the consumers because it is convenient and easy to use.

Many traditional speaker systems reply on wired connections. These systems are large and often difficult to install. Further, traditional speaker systems often need a separate transceiver to send and receive audio signals and control signals. This type of system configurations may make the speaker system large and expensive to install. As smartphones and other portable devices are being used widely as control terminals, the traditional set-up for the speaker systems has become out-of-date.

The disclosed method and system are directed to solve one or more problems set forth above and other problems.

BRIEF SUMMARY OF THE DISCLOSURE

Embodiments consistent with the present disclosure provide a multifunctional LED device and a multifunctional speaker system that are easy to wire. Such systems do not need to include a separate wireless transceiver or certain peripherals such as a remote control unit or a light switch.

One aspect of the present disclosure provides a multifunctional wireless LED device. The multifunctional LED device may include an LED power supply unit configured to supply power to an LED lighting unit and drive the LED device; a wireless transceiver configured to receive and send audio signals and control signals to and from a smart terminal; and a control unit configured to process audio signals and control signals and to control components of the LED device. The wireless transceiver may send the received signals to the control unit for further processing. The multifunctional LED device may further include a speaker configured to play audio signals; an audio power amplifier configured to receive processed audio signals from the control unit and to drive the speaker; and an LED lighting unit configured to emit light. The LED lighting unit receives control signals from the control unit and adjusts light emission accordingly.

Moreover, the multifunctional LED device may include an audio codec unit that is connected to the control unit and the audio power amplifier. The audio codec unit may send the audio signals processed by the control unit to the audio power amplifier.

Another aspect of the present disclosure provides another multifunctional wireless LED device. The multifunctional LED device may include an LED power supply unit configured to supply power to an LED lighting unit and drive the LED device; a wireless transceiver configured to receive and send audio signals and control signals, and send the received signals to other multifunctional LED devices; and a control unit configured to process audio signals and controlling commands and to control components of the LED device. The wireless transceiver may send received signals to the control unit for further processing. The multifunctional LED device may further include a speaker configured to play audio signals; an audio power amplifier configured to receive processed audio signals from the control unit and to drive the speaker; and an LED lighting unit configured to emit light. The LED lighting unit receives control signals from the control unit and adjusts the light emission accordingly.

Moreover, the multifunctional LED device may include an audio codec unit that is connected to the control unit and the audio power amplifier. The audio codec unit may send the audio signals processed by the control unit to the audio power amplifier.

Moreover, the control unit of the multifunctional LED device may be a micro-controller, digital signal processor, or IC controller, or a combination thereof. The control unit processes audio signals.

The wireless transceiver of the multifunctional LED device may support frequency bands such as 2.4 GHz, 5.2 GHz, 5.8 GHz, or a combination of the above working frequencies and support bi-directional transmission.

Another aspect of the present disclosure provides a multifunctional sound system. The multifunctional sound system may include two multifunctional LED devices each having two wireless transceivers; and a smart terminal configured to monitor and remotely control the multifunctional LED devices. Further, one of the two multifunctional LED devices may receive signals from the smart terminal and send the received signals to the other multifunctional LED device.

Further, the smart terminal may set a first multifunctional LED device as a central device, and a second multifunctional LED device as a receiving device. The first central device may receive control signals or audio signals from the smart device and send the signals to the receiving device.

Another aspect of the present disclosure provides another multifunctional sound system. The multifunctional sound system includes a first multifunctional LED device with two wireless transceivers; a second multifunctional LED device with one wireless transceiver; and a smart terminal configured to monitor and remotely control the multifunctional LED devices. Further, the first multifunctional LED devices may receive signals from the smart terminal and send the received signals to the second multifunctional LED device. The smart terminal may be a smartphone, a smart TV, a tablet, a desktop computer, or a wireless Dongle, etc.

During the operations of a first multifunctional LED device (with two wireless transceivers), the power supply of the multifunctional LED device may power up the LED lighting unit and the multifunctional LED device. The smart terminal may send wireless audio signals and control signals to the first wireless transceiver. The first wireless transceiver may send the audio signals and control signals to the control unit. The control unit may process the received signals and send the processed signals to the second wireless transceiver and/or the audio power amplifier. The second wireless transceiver may send the audio signals and control signals to other multifunctional LED devices. The control unit may send feedback signals to the smart terminal.

Embodiments consistent with the present disclosure are easy to install, require little wiring, and do not require adding a separate transceiver, a separate remote control unit, or a separate light switch. Embodiments consistent with the present disclosure support wireless lighting control and provide efficient lighting. Embodiments consistent with the present disclosure may be low cost, relatively small, and suitable for various lighting and audio applications in residential and commercial settings.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Figure 1:
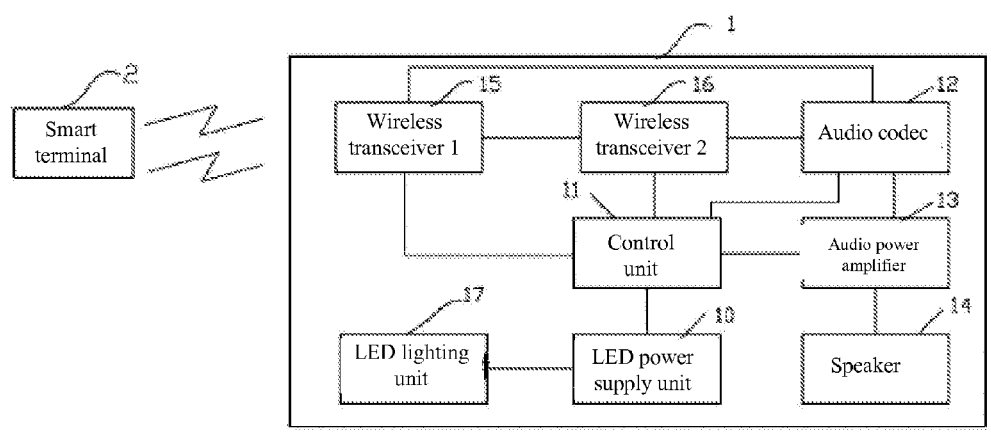
FIG. 1 is a block diagram of an exemplary multifunctional LED device consistent with various disclosed embodiments.

An exemplary embodiment consistent with the present disclosure is described below. FIG. 1 illustrates an exemplary configuration of a multifunctional LED device consistent with the present disclosure. The multifunctional LED device 1 may include a smart terminal 2, an LED power supply unit 10, a control unit 11, an audio codec unit 12, an audio power amplifier 13, a speaker 14, a first wireless transceiver 15, a second wireless transceiver 16, and an LED lighting unit 17.

As shown in FIG. 1, the LED power supply unit 10 may drive the LED lighting unit 17 and supply power to the LED device 1. The first wireless transceiver 15 may receive digital audio signals and controlling signals from the smart terminal 2. The first wireless transceiver 15 may then send the received data to the control unit 11. The control unit 11 may process the digital audio signals, and may send the processed audio signals to the second wireless transceiver 16. The wireless transceiver 15 may send the received digital audio signal to the audio codec unit 12. The audio codec unit 12 may code/decode the received audio signals, and may send the processed audio signals to the audio power amplifier 13. The audio codec unit 12 may be connected to the second wireless transceiver 16. The control unit 11 may send feedback information to the smart terminal 2 through the first wireless transceiver 15. The first wireless transceiver 15 may also be connected to the second wireless transceiver 16.

Further, the control unit 11 may process the received audio signals using various algorithms. The control unit 11 may be a microprocessor, a digital processor, a digital integrated circuit (IC), or a combination thereof. The first wireless transceiver 15 may receive digital audio signals and controlling signals from the smart terminal 2 and send the received signals to the control unit 11. The control unit 11 may process the digital audio signals and control signals, and send the processed signals to the audio power amplifier 13 and the wireless transceiver 16. The audio power amplifier 13 may be connected to the speaker 14. The control unit 11 may communicate with the second wireless transceiver 16. The control unit 11 may also use the second wireless transceiver 16 to communicate with other LED devices.

In some embodiments, the first wireless transceiver 15 and second wireless transceiver 16 may support frequency bands such as 2.4 GHz, 5.2 GHz, 5.8 GHz, and other working frequencies or the combinations thereof. They may be capable of both receiving and sending data. They may be connected to the internet or a local area network to realize remote control of multifunctional LED devices.

The LED power supply unit 10 may supply the power for the LED lighting unit 17. In some embodiments, the control unit 11 may be connected to the LED power supply unit 10. After receiving control signals, the control unit 11 may generate Pulse Width Modulation (PWM) waves. The control unit 11 may generate PWM signals with a set frequency and an adjustable duty cycle or PWM signals with a set duty cycle with an adjustable frequency. These PWM signals may be sent to the power supply unit 10 to control the LED lighting unit 17.

Moreover, the smart terminal 2 can be a smartphone, a smart television, a tablet, a desktop computer, a wireless dongle, and/or other computing devices.

Figure 2:
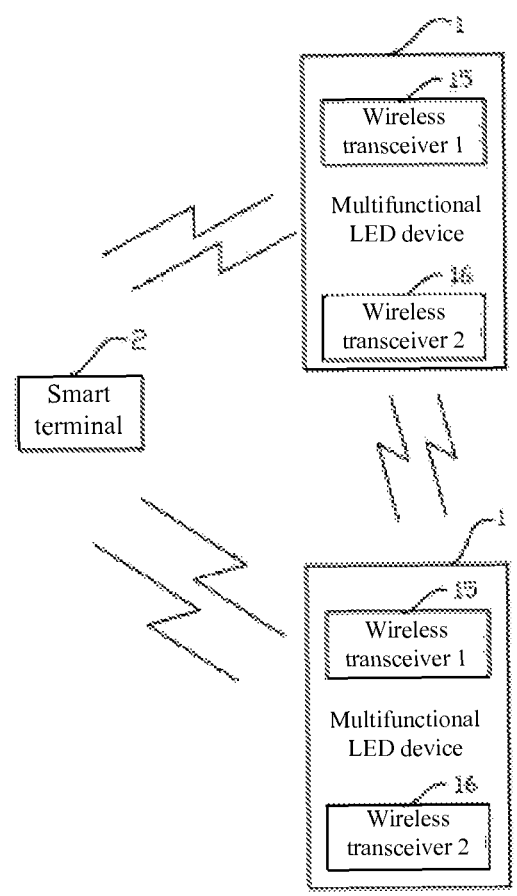
FIG. 2 is a block diagram of an exemplary multifunctional speaker system consistent with various disclosed embodiments.

FIG. 2 is an exemplary embodiment of a multifunctional speaker system consistent with present disclosure. The system may include several above-mentioned multifunctional LED devices 1 and smart terminals 2. A smart terminal 2 may communicate with any of the multifunctional LED devices 1 in the system. In addition, the multifunctional LED devices 1 may communicate among themselves. As shown in FIG. 2, two multifunctional LED devices 1 may be configured to form a 2-channel speaker system. More multifunctional LED devices may be added to the system to form 2.1-channel, 5.1-channel, or 7.1-channel speaker systems. In theory, any number of audio channels in the wireless speaker system may be realized through this method.

Each multifunctional LED device 1 may include a first wireless transceiver 15 and a second wireless transceiver 16. The multifunctional speaker system may set one of the multifunctional LED devices 1 as a central unit, and set the other the multifunctional LED device as a receiving unit. The central unit may receive audio signals and control signals from the smart terminal 2, and then send the received information to other receiving units within its coverage.

Figure 3:
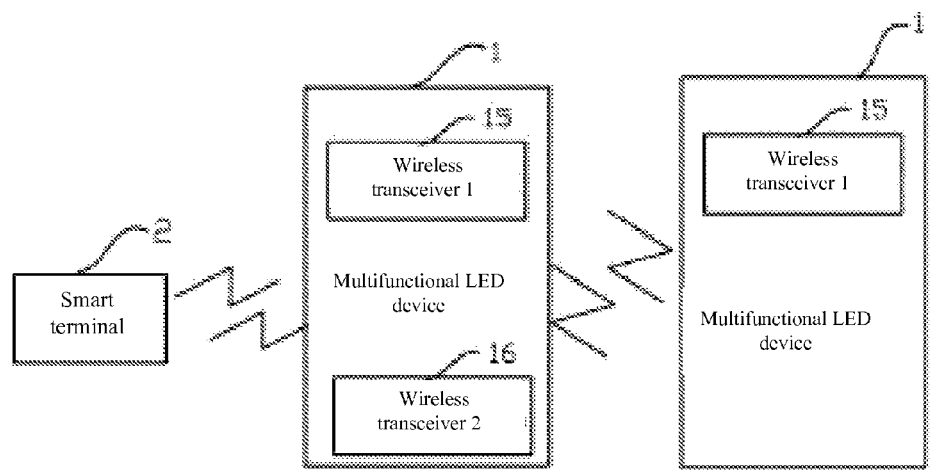
FIG. 3 is another block diagram of an exemplary multifunctional speaker system consistent with various disclosed embodiments.

As shown in FIG. 3, in one embodiment, the multifunctional speaker system may include a number of the multifunctional LED devices. One of the multifunctional LED devices includes a first wireless transceiver 15 and a second wireless transceiver 16. The rest of the multifunctional LED devices may only include second wireless transceivers 16. The smart terminal 2 may set the one multifunctional LED devices with two wireless transceivers as a central unit, and set the rest of the one-transceiver multifunctional LED devices as receiving units. The central unit may receive audio signals and control signals from the smart terminal 2, and then send the received information to other receiving units within its coverage.

In some embodiments, the smart terminal 2 may act as the central control unit. The multifunctional LED devices may form a star and/or mesh network. The central control unit may control each of the devices in the network.

Figure 4:
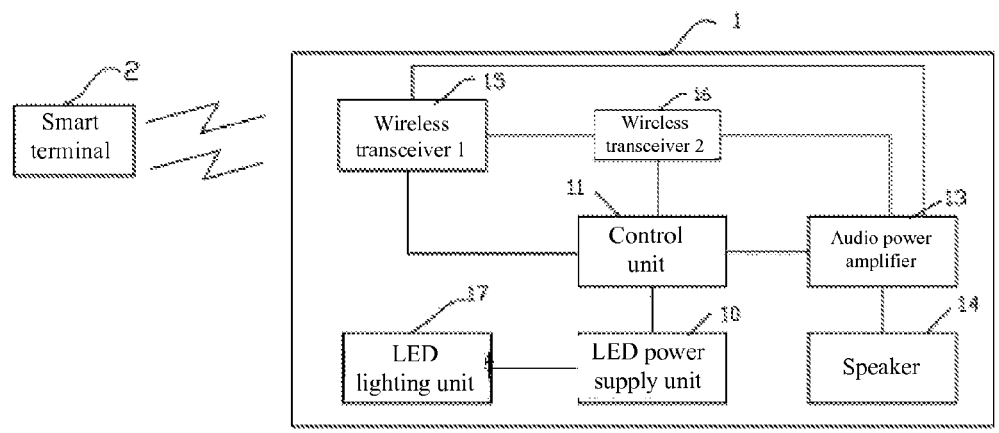
FIG. 4 is another block diagram of an exemplary multifunctional LED device consistent with various disclosed embodiments.

FIG. 4 shows another embodiment of the multifunctional LED device. In FIG. 4, the multifunctional LED device does not include an audio codec unit. After receiving audio signals and control signals from the first wireless transceiver 15, the control unit 11 may process the audio signals according to predefined algorithms. The control unit 11 may then send the processed audio signals to the audio power amplifier 13 and the second wireless transceiver 16. The second wireless transceiver 16 may be connected to the audio power amplifier 13. The audio power amplifier 13 may be connected to the speaker unit 14.

In various embodiments, the multifunctional LED device 1 can be configured as one single device. For example, the at least one power supply unit, the at least one control unit, the at least one audio power amplifier unit, the at least one wireless transceiver, the at least one speaker unit, and/or the at least one audio codec unit, can be integrated into the one LED lighting device 1 to form the single device. Accordingly, the multifunctional speaker system can include a plurality of the multifunctional LED devices each configured as one single device.

In an exemplary multifunctional LED device 1, the speaker unit 14 can be integrated together with driver circuit of the LED drive and power supply unit 10 to save space and to reduce wire loss on of a distributed design. In one embodiment, to ensure the transceiver 15/16 functions as the wireless transceiver module as desired, an embedded antenna can be included in the integrated multifunctional LED device 1. The embedded antenna can be configured to fit a shape of the lamp body of the multifunctional LED device 1 without increasing the size of the resultant device and to maintain the design of the resultant device.

In various embodiments, the wireless transceivers 15 and 16 may also be configured with automatic frequency hopping functions to avoid interference with other radio devices. Furthermore, noise reduction and/or echo cancellation technologies can be applied using software and hardware products to provide the multifunctional LED device 1 with desired audio effects.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

In some embodiments, the multifunctional LED device 1 may include one or more sensors for detecting objects or movements of objects in a room. The control unit 11 may then control the multifunctional LED devices 1 based on the data received from the sensors. For example, in a room using multiple multifunctional LED devices 1 to implement a wireless multifunctional speaker system, the sensors integrated in the multifunctional LED devices 1 may detect the position and movements of the a person in the room. The multifunctional wireless speaker system may then adjust the multifunctional LED device(s) 1 close to the person and the multifunctional LED device(s) 1 far away from the person accordingly to various algorithms to better broadcast the audio signals. For example, the control unit 11 may amplify certain frequency bands in the multifunctional LED device(s) 1 close to the person. In another example, the control unit 11 may also adjust the lighting (e.g., dimming) in the multifunctional LED device(s) 1 far away from the person.

REFERENCE SIGN LIST

Multifunctional LED device 1
Smart terminal 2
Power supply unit 10
Control unit 11
Audio codec unit 12
Audio power amplifier 13
Speaker 14
Wireless transceiver 15
Wireless transceiver 16
LED light source assembly 17

What is claimed is:

1. A multifunctional LED lighting device, comprising:
    an LED power supply unit configured to supply power to an LED lighting unit and drive the multifunctional LED device;
    a wireless transceiver configured to receive and send audio signals and control signals from and to a smart terminal;
    a control unit configured to receive from and send signals to the wireless transceiver, to process audio signals and control signals, and to control other components of the multifunctional LED device;
    a speaker configured to play audio signals;
    an audio power amplifier configured to receive processed audio signals from the control unit and to drive the speaker; and
    an LED lighting unit configured to emit light according to control signals received from the control unit and provide an indoor lighting;
    wherein the control unit is further configured to control the LED lighting unit to brighten or dim the indoor lighting according to a control signal.

2. The multifunctional LED lighting device according to claim 1, further includes:
    an audio codec unit configured to be connected to the control unit and the audio power amplifier, wherein the audio codec unit sends the audio signals processed by the control unit to the audio power amplifier.

3. The multifunctional LED lighting device according to claim 1, wherein the control unit is a micro-controller, a digital signal processor, an IC controller, or a combination thereof, and the control unit processes audio signals.

4. The multifunctional LED lighting device according to claim 1, wherein the wireless transceiver supports 2.4 GHz, 5.2 GHz, 5.8 GHz, or a combination of the above working frequencies, and supports bi-directional transmission.

5. The multifunctional LED lighting device according to claim 1, further comprising:
one or more sensors for detecting objects or movements of objects in a room;
wherein the control unit is further configured to control the multifunctional LED lighting device based on data received from the one or more sensors.

6. The multifunctional LED lighting device according to claim 5, wherein:
the multifunctional LED lighting device is one of multiple multifunctional LED devices that form a wireless multifunctional speaker system;
the one or more sensors integrated in the multifunctional LED devices detect a position and movements of a person in the room; and
the wireless multifunctional speaker system adjusts the audio signals and the control signals of the multifunctional LED device based on the detected position and movements, including at least one of:
when the multifunctional LED device is close to the person, amplifying one or more frequency bands of the audio signals or brightening the light; and
when the multifunctional LED device is far away from the person, decreasing one or more frequency bands of the audio signals or dimming the light.

7. A multifunctional LED lighting device, comprising:
an LED power supply unit configured to supply power to an LED lighting unit and drive the multifunctional LED device;
a wireless transceiver configured to receive and send audio signals and control signals, and to send signals to other multifunctional LED devices;
a control unit configured to receive from and send signals to the wireless transceiver, to process audio signals and control signals, and to control other components of the multifunctional LED device;
a speaker configured to play audio signals;
an audio power amplifier configured to receive processed audio signals from the control unit and to drive the speaker; and
an LED lighting unit configured to emit light according to control signals received from the control unit and provide an indoor lighting;
wherein the control unit is further configured to control the LED lighting unit to brighten or dim the indoor lighting according to a control signal.

8. The multifunctional LED lighting device according to claim 7, further includes:
an audio codec unit configured to be connected to the control unit and the audio power amplifier, wherein the audio codec unit sends the audio signals processed by the control unit to the audio power amplifier.

9. The multifunctional LED lighting device according to claim 7, wherein the wireless transceiver supports 2.4 GHz, 5.2 GHz, 5.8 GHz, or a combination of the above working frequencies, and supports bi-directional transmission.

10. A wireless multifunctional sound system, comprising:
two multifunctional LED lighting devices each having two wireless transceivers including a first wireless transceiver and a second wireless transceiver; and
a smart terminal configured to monitor and remotely control the multifunctional LED lighting devices;
wherein a first multifunctional LED lighting device receives signals from the smart terminal through the first wireless transceiver and sends the received signals to a second multifunctional LED lighting device through the second wireless transceiver;
the two multifunctional LED lighting devices each has a control unit for controlling audio broadcasting and light emission of the multifunctional LED lighting device, including dimming and brightening the multifunctional LED lighting device; and
each control unit of the two multifunctional LED lighting devices is connected to the two wireless transceivers of the two multifunctional LED lighting devices.

11. The wireless multifunctional sound system according to claim 10, wherein the smart terminal sets the first multifunctional LED lighting device as a central device, and the second multifunctional LED lighting device as a receiving device, the central device receiving control signals or audio signals from the smart terminal and sending the signals to the receiving device.

12. The wireless multifunctional sound system according to claim 10, wherein the smart terminal act as a central device, and the multifunctional LED lighting devices act as receiving devices, the central device sending control signals and audio signals to the receiving devices.

13. The wireless multifunctional speaker system according to claim 10, wherein the smart terminal is a smartphone, a smart TV, a tablet, a desktop computer, or a wireless Dongle.

14. The wireless multifunctional speaker system according to claim 10, wherein:
the first wireless transceiver is used to communicate with the mobile terminal; and
the second wireless transceiver is used to communicate with another multifunctional LED lighting device.

15. The wireless multifunctional speaker system according to claim 10, wherein:
the first wireless transceiver receives digital audio signals from the smart terminal, and send the received digital audio signals to the control unit;
the control unit process the received digital audio signals, and send the processed audio signals to the second wireless transceiver; and
the second wireless transceiver sends the processed audio signals to the another multifunctional LED lighting device.

16. A wireless multifunctional sound system, comprising:
a first multifunctional LED lighting device with two wireless transceivers including a first wireless transceiver and a second wireless transceiver;
a second multifunctional LED lighting device with one wireless transceiver; and
a smart terminal configured to monitor and remotely control the multifunctional LED lighting devices;
wherein: the first multifunctional LED lighting device receives signals from the smart terminal through the first wireless transceiver and sends the received signals to the second multifunctional LED lighting device through the second wireless transceiver;
the first and the second multifunctional LED lighting devices each has a control unit for controlling audio broadcasting and light emission of the multifunctional LED lighting device, including dimming and brightening the multifunctional LED lighting device;

the control unit of the first multifunctional LED lighting devices is connected to the two wireless transceivers of the first multifunctional LED lighting device; and the control unit of the second multifunctional LED lighting devices is connected to the one wireless transceiver of the second multifunctional LED lighting device.

17. The wireless multifunctional sound system according to claim 16, wherein the smart terminal sets the first multifunctional LED lighting device as a central device, and the second multifunctional LED lighting device as a receiving device, the central device receiving control signals or audio signals from the smart terminal and sending the signals to the receiving device.

\* \* \* \* \*